United States Patent [19]
Busby

[11] 3,712,662
[45] Jan. 23, 1973

[54] COLLAPSIBLE TABLE TRAILER

[75] Inventor: John T. Busby, Memphis, Tenn.

[73] Assignee: The Raymond Lee Organization, Inc., New York, N.Y.

[22] Filed: Aug. 25, 1971

[21] Appl. No.: 174,872

[52] U.S. Cl. .............................296/23 R, 224/42.41
[51] Int. Cl. .............................................B60p 3/32
[58] Field of Search .........296/22, 23, 24; 224/42.41, 224/42.23; 108/16, 17, 18, 19, 42, 44, 48, 49

[56] References Cited

UNITED STATES PATENTS

| | | | |
|---|---|---|---|
| 1,317,895 | 10/1919 | Rudy | 296/23 R |
| 2,607,518 | 8/1952 | Cohen | 224/42.41 |

Primary Examiner—Philip Goodman
Assistant Examiner—John Carroll
Attorney—Richard S. Shreve, Jr.

[57] ABSTRACT

A trailer adapted to be pulled by an automobile or the like has a hollow dust proof carrying rack secured to the bottom of its frame with a table top having support means secured thereto disposed removably therein. When the top is removed, on of its support means detachably engages a mating support means on the outside surface of a trailer wall while another means constitutes a foldable leg which can be disposed vertically to hold the top in horizontal position for use.

4 Claims, 3 Drawing Figures

PATENTED JAN 23 1973
3,712,662
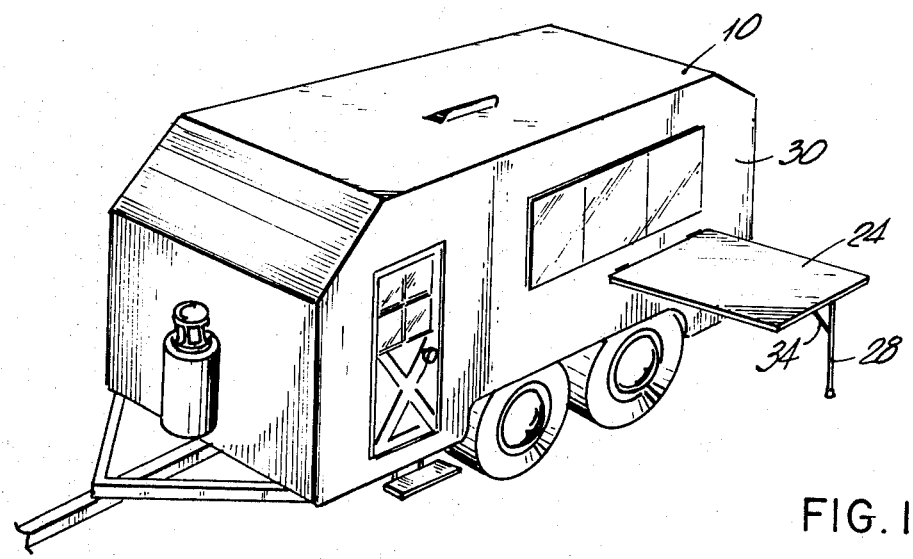
FIG. 1
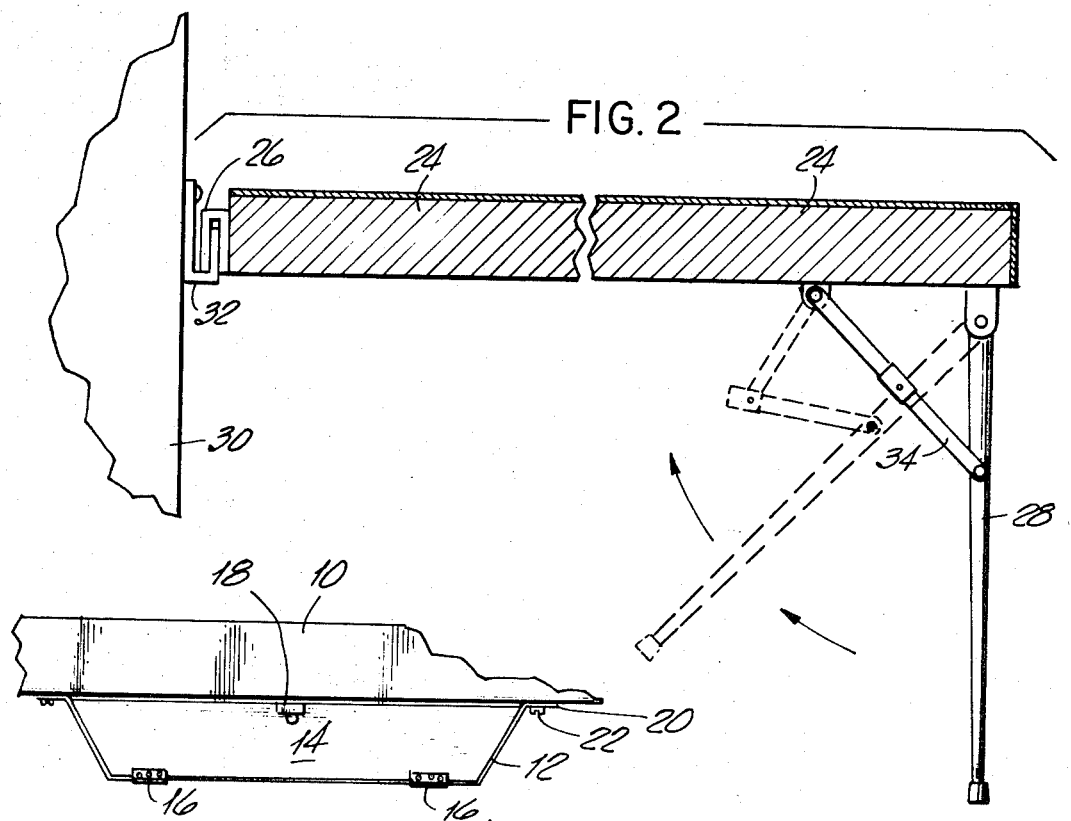
FIG. 2
FIG. 3
INVENTOR.
JOHN T. BUSBY

COLLAPSIBLE TABLE TRAILER

FIELD OF THE INVENTION

My invention is directed toward a trailer adapted to be pulled by a vehicle such as an automobile and provided with a light weight portable durable table for dining, games and the like.

SUMMARY

To this end, I provide a horizontally elongated hollow container with an access door that constitutes a hollow dust proof carrying rack. This rack is secured to the bottom of the frame of the trailer with the door conveniently available.

Removably disposed in the rack is a table top with first and second securing means secured to opposite ends. The first means is a leg with a mechanism enabling the leg to be placed in either folded or extended position. The second means is adapted to detachably engage mating support means disposed horizontally on the outer surface of one of the walls of the trailer.

In use, the top with its means is removed from the rack. The second means is engaged with the mating means and the leg is placed in vertical extended position. In this manner, the table is ready for use. Quick and easy disassembly is obtained by disengaging the second means from the mating means, folding the leg and placing the top with its means in the rack.

The table top can be formed of chip board or formica covered plywood, whereby it never needs painting, will not warp or rust and is heat and stain resistant.

The mounting hardware can be stainless or cadmium plated steel. The leg can be chrome plated steel.

BRIEF DESCRIPTION OF THE DRAWINGS

In the drawings:

FIG. 1 is a perspective of my invention ready for use;

FIG. 2 is an enlarged cross section of a portion of the structure shown in FIG. 1; and FIG. 3 is a detail rear view of portion of the structure shown in FIG. 1.

DETAILED DESCRIPTION OF PREFERRED EMBODIMENTS

Referring now to FIGS. 1—3, there is shown a trailer 10. Secured underneath the trailer frame is a horizontally elongated hollow container 12 with an access door 14 normally in vertical position secured by hinges 16 to the bottom of the container and by latch 18 to the top of the container. The container is otherwise sealed and forms with the door a hollow dust proof carrying rack. The top portion of the container has flanges 20 with holes through which screws 22 extend into the frame of the trailer as support.

A table top 24 can be removably disposed in the rack when not in use. The top 24 has at one end a horizontally elongated member 26 having in cross section the shape of an inverted U. The top has at the other end an elongated leg 28 secured to this end by a linkage mechanism 34 which can be manually operated to place the leg either in horizontal folded position or vertical extended position.

One outside wall surface 30 of the trailer is provided with a horizontally elongated member 32 secured thereto and having in cross section the shape of an upright U, to receive the dependent flange of member 26.

In use, member 26 engages member 32 and leg 28 is extended vertically to erect the table as shown. The table can be easily collapsed and stored as previously described.

If desired, each of members 26 and 32 can be formed of several spaced sections.

While I have described my invention with particular reference to the drawings, such is not to be considered as limiting its actual scope.

Having thus described this invention, what is asserted as new is:

1. In combination with a vehicular trailer having support means on the outer surface of a wall:
   a hollow dustproof rack disposed underneath the frame of the trailer with an access door readily accessable in the rack; and
   a table top having support means secured at each end and removably disposed in the rack, one of said table support means being engageable with the trailer support means and the other support means including a leg having a folded position parallel to the top and an extended position at right angles to the top.

2. The combination as wet forth in claim 1 wherein said trailer support means is an elongated horizontally extending member which in cross section defines an upright U.

3. The combination as set forth in claim 2 wherein said first means is a horizontally elongated member which in cross section defines an inverted U.

4. The combination as set forth in claim 3 wherein said second means includes a manually operable linkage mechanism disposed between leg and table top.

* * * * *